US012338950B2

(12) United States Patent
Kato et al.

(10) Patent No.: US 12,338,950 B2
(45) Date of Patent: *Jun. 24, 2025

(54) GAS TANK AND METHOD FOR MANUFACTURING THE SAME

(71) Applicant: TOYOTA JIDOSHA KABUSHIKI KAISHA, Toyota (JP)

(72) Inventors: Kei Kato, Nagakute (JP); Yuki Kai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

This patent is subject to a terminal disclaimer.

(21) Appl. No.: 18/316,186

(22) Filed: May 11, 2023

(65) Prior Publication Data
US 2023/0375132 A1 Nov. 23, 2023

(30) Foreign Application Priority Data
May 19, 2022 (JP) .................. 2022-082308

(51) Int. Cl.
*F17C 1/06* (2006.01)
(52) U.S. Cl.
CPC ........ *F17C 1/06* (2013.01); *F17C 2201/0109* (2013.01); *F17C 2203/012* (2013.01);
(Continued)
(58) Field of Classification Search
CPC ............... F17C 1/06; F17C 2201/0109; F17C 2203/012; F17C 2203/0604;
(Continued)

(56) References Cited

U.S. PATENT DOCUMENTS 7,195,133 B1* 3/2007 Cundiff .................... F17C 1/04
220/589
8,932,695 B1* 1/2015 Villarreal ................. F17C 1/06
428/36.1
(Continued)

FOREIGN PATENT DOCUMENTS

CN 110822280 A 2/2020
CN 111503265 A 8/2020
(Continued)

OTHER PUBLICATIONS

English Machine Translation of WO-2016074952-A1 (Year: 2016).*
(Continued)

*Primary Examiner* — Don M Anderson
*Assistant Examiner* — Laura E. Parker
(74) *Attorney, Agent, or Firm* — Hunton Andrews Kurth LLP

(57) ABSTRACT

A gas tank includes: a liner including a tubular body portion having a central axis and a dome portion being located at each of two ends of the body portion; and a reinforcing layer covering the outer periphery of the liner. The reinforcing layer includes at least one a first fiber layer. The first fiber layer includes, on an outer periphery of the body portion, a first reinforcing portion and a second reinforcing portion. The first reinforcing portion is a portion in which fibers are wound in a staggered weave pattern, and the second reinforcing portion is a portion in which the fibers are wound at a predetermined angle with respect to the central axis.

9 Claims, 12 Drawing Sheets

(52) U.S. Cl.
CPC .............. *F17C 2203/0604* (2013.01); *F17C 2203/0619* (2013.01); *F17C 2203/066* (2013.01); *F17C 2203/0673* (2013.01); *F17C 2205/0305* (2013.01); *F17C 2209/2109* (2013.01); *F17C 2209/2154* (2013.01); *F17C 2221/012* (2013.01); *F17C 2223/035* (2013.01); *F17C 2260/01* (2013.01); *F17C 2270/0168* (2013.01); *F17C 2270/0184* (2013.01)

(58) Field of Classification Search
CPC ........ F17C 2203/0619; F17C 2203/066; F17C 2203/0673; F17C 2209/2109; F17C 2209/2154; F17C 1/04; F17C 1/16; F17C 2203/0663; F17C 2203/0602; F17C 2203/0612; F17C 2203/0621; F17C 2203/0624; F17C 2203/0665; F17C 2203/0668; F17C 2203/067; F17C 1/02; F17C 2203/011
USPC ........................................................ 220/590
See application file for complete search history.

(56) References Cited

U.S. PATENT DOCUMENTS

| 2009/0314785 | A1 | 12/2009 | Cronin et al. |
| 2015/0192251 | A1 | 7/2015 | Tupper et al. |
| 2018/0104916 | A1* | 4/2018 | Nishiwaki ............... B29C 70/16 |
| 2020/0049312 | A1* | 2/2020 | Sawai ....................... F17C 1/02 |
| 2020/0072415 | A1 | 3/2020 | Kamiya et al. |
| 2020/0247070 | A1 | 8/2020 | Katano |
| 2021/0154953 | A1* | 5/2021 | Sawai ................... B29C 70/546 |
| 2021/0370577 | A1 | 12/2021 | Hatta |
| 2023/0375133 | A1* | 11/2023 | Kai ........................... F17C 1/06 |

FOREIGN PATENT DOCUMENTS

| CN | 112856210 A | 5/2021 | |
| DE | 102017206521 A1 | 10/2018 | |
| JP | 2006194332 A | 7/2006 | |
| JP | 2018179248 A | 11/2018 | |
| JP | 2018187775 A | 11/2018 | |
| JP | 2020026817 A | 2/2020 | |
| JP | 2021050433 A | 4/2021 | |
| JP | 2021187094 A | 12/2021 | |
| JP | 2022032231 A | 2/2022 | |
| KR | 20200018223 A | 2/2020 | |
| WO | WO-2016074952 A1 * | 5/2016 | .............. D04C 1/06 |
| WO | WO-2020209034 A1 * | 10/2020 | |

OTHER PUBLICATIONS

English Machine Translation of WO-2020209034-A1 (Year: 2020).*
Office Action issued to U.S. Appl. No. 18/318,077 on Jul. 29, 2024 (16 pages).
U.S. Appl. No. 18/318,077, filed May 16, 2023.

* cited by examiner

GAS TANK AND METHOD FOR MANUFACTURING THE SAME

CROSS-REFERENCE TO RELATED APPLICATION

This application claims priority to Japanese Patent Application No. 2022-082308 filed on May 19, 2022, incorporated herein by reference in its entirety.

BACKGROUND

1. Technical Field

The present disclosure relates to gas tanks and methods for manufacturing the same.

2. Description of Related Art

A gas tank is known in the art in which fiber layers are stacked on the outer peripheral surface of a container body (e.g., Japanese Unexamined Patent Application Publication No. 2020-026817 (JP 2020-026817 A)). In this gas tank, each fiber layer includes a first reinforcing portion in which reinforcing fibers are wound in a staggered weave pattern, and a second reinforcing portion in which the reinforcing fibers are wound in a helical pattern so as to be continuous with the first reinforcing portion. The gas tank is obtained by impregnating the stacked fiber layers with a thermosetting resin and heating and curing the resin.

SUMMARY

The second reinforcing portion in which the reinforcing fibers are wound in a helical pattern may not be sufficiently impregnated with the thermosetting resin due to the high fiber density.

The present disclosure is provided as the following aspects.

(1) An aspect of the present disclosure provides a gas tank. The gas tank includes: a liner including a tubular body portion with a central axis and a dome portion being located at each of two ends of the body portion; and a reinforcing layer covering an outer periphery of the liner. The reinforcing layer includes at least one first fiber layer. The first fiber layer includes, on an outer periphery of the body portion, a first reinforcing portion and a second reinforcing portion, the first reinforcing portion being a portion in which fibers are wound in a staggered weave pattern, and the second reinforcing portion being a portion in which the fibers are wound at a predetermined angle with respect to the central axis. According to the gas tank of this aspect, the first fiber layer includes the second reinforcing portion. Therefore, the strength of the fiber layer is increased, so that the strength of the gas tank can be increased. The first fiber layer also includes the first reinforcing portion. Therefore, impregnation performance of the fiber layer with the resin material can be improved.

(2) In the gas tank of the above aspect, the first fiber layer may include a plurality of the first reinforcing portions and a plurality of the second reinforcing portions.

According to the gas tank of this aspect, the first fiber layer includes a plurality of the first reinforcing portions. Therefore, a plurality of flow paths of the resin material through the first reinforcing portions can be formed, and the impregnation performance of the fiber layer with the resin material can be improved.

(3) In the gas tank of the above aspect, the first reinforcing portion in an upper first fiber layer may include an overlapping portion stacked on at least a part of the first reinforcing portion in a lower first fiber layer.

According to the gas tank of this aspect, the first reinforcing portion in the upper first fiber layer is stacked on the first reinforcing portion in the lower first fiber layer in an overlapping manner. Therefore, the impregnation performance of the fiber layers with the resin material can be improved.

(4) In the gas tank of the above aspect, the first reinforcing portion may be included in all of the fiber layers included in the reinforcing layer, and the overlapping portion may be included in all of the first fiber layers included in the reinforcing layer.

According to the gas tank of this aspect, the overlapping portion is included in all of the first fiber layers. Therefore, the impregnation performance of the fiber layers with the resin material can further be improved.

(5) In the gas tank of the above aspect, the first reinforcing portion in the upper first fiber layer may be located at a position shifted in an axial direction of the liner from the first reinforcing portion in the lower first fiber layer.

According to the gas tank of this aspect, the first reinforcing portions are located at positions shifted from each other in the axial direction. Therefore, stress concentration in the reinforcing layer can be reduced as compared to the case where the first reinforcing portions are stacked linearly on top of each other in a stacking direction.

(6) In the gas tank of the above aspect, the first reinforcing portion in the upper first fiber layer may be stacked on a part of the first reinforcing portion other than the overlapping portion in the lower first fiber layer.

According to the gas tank of this aspect, the first reinforcing portions are stacked so that no overlapping portion is formed on any overlapping portion. Therefore, stress concentration in the reinforcing layer can be reduced.

(7) In the gas tank of the above aspect, a difference between maximum and minimum values of a total number of the first reinforcing portions in a stacking direction in the reinforcing layer may be three or less.

According to the gas tank of this aspect, the number of first reinforcing portions is made substantially uniform in the axial direction. Therefore, a gas tank with a good balance between strength of the fiber layers and reduction in insufficient impregnation with the resin material can be obtained.

(8) In the gas tank of the above aspect, an outermost layer of the reinforcing layer may be a second fiber layer that includes the first reinforcing portion and that does not include the second reinforcing portion.

According to the gas tank of this aspect, distortion of a pattern of fiber materials on the outer surface of the fiber layer can be reduced or prevented.

(9) In the gas tank of the above aspect, an innermost layer of the reinforcing layer may be a second fiber layer that includes the first reinforcing portion and that does not include the second reinforcing portion.

According to the gas tank of this aspect, insufficient impregnation of the innermost layer that is difficult to be impregnated with the resin material can be reduced or prevented.

(10) In the gas tank of the above aspect, the first fiber layer may include the first reinforcing portion on an outer periphery of the dome portion.

According to the gas tank of this aspect, the first reinforcing portion is formed on the outer periphery of the dome portion having a curvature. This configuration can reduce displacement of the fiber materials from their intended positions as compared to the case where the second reinforcing portion is formed on the outer periphery of the dome portion.

Another aspect of the present disclosure provides a method for manufacturing a gas tank. The method includes the steps of: preparing a liner including a tubular body portion with a central axis and a dome portion being located at each of two ends of the body portion; and forming a base body, the base body being the liner with a fiber layer provided on an outer periphery of the liner. The step of forming the base body includes the step of forming at least one first fiber layer that includes, on an outer periphery of the body portion, a first reinforcing portion and a second reinforcing portion, the first reinforcing portion being a portion in which fibers are wound in a staggered weave pattern, and the second reinforcing portion being a portion in which the fibers are wound at a predetermined angle with respect to the central axis.

The method of the above aspect may further include the steps of: placing the base body in a mold and closing the mold; and filling the closed mold with a resin material to impregnate the fiber layer of the base body with the resin material.

The present disclosure can also be implemented in various forms other than the gas tank and the method for manufacturing a gas tank. For example, the present disclosure can be implemented in forms such as a method for forming a fiber reinforced resin layer, a method for manufacturing fiber reinforced plastic, a manufacturing device for fiber reinforced plastic, a method for controlling a manufacturing device for a gas tank or a manufacturing device for fiber reinforced plastic, a computer program that implements the control method, and a non-transitory recording medium having the computer program recorded thereon.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
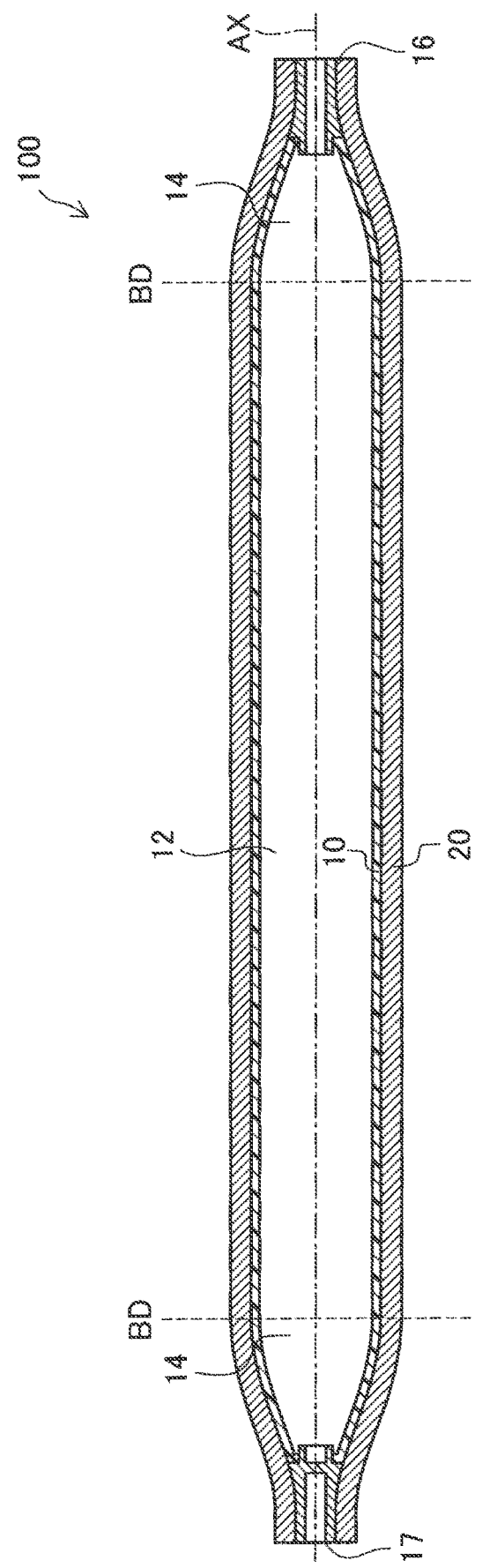
FIG. 1 illustrates the configuration of a gas tank according to a first embodiment of the present disclosure as viewed in section.

FIG. 1 illustrates the configuration of a gas tank 100 according to a first embodiment of the present disclosure as viewed in section. The gas tank 100 is a storage container for storing a high-pressure fluid with a pressure of 10 MPa to 70 MPa. The gas tank 100 can be formed in any shape. In the example of FIG. 1, the gas tank 100 has an elongated generally cylindrical outer shape along a central axis AX.

For example, the gas tank 100 is used to store hydrogen gas to be supplied to a vehicle fuel cell or a stationary fuel cell. The gas tank 100 includes a liner 10, bosses 16, 17 placed at both ends of the liner 10, and a fiber reinforced resin layer 20 formed on the outer peripheral surface of the liner 10 and the outer peripheral surfaces of the bosses 16, 17. The gas tank 100 need not necessarily store hydrogen gas but may store any of various other fluids such as oxygen and natural gas.

The liner 10 is a container having an interior space for sealing a fluid. The liner 10 is made of a resin having gas barrier properties, such as nylon, polyamide, ethylene-vinyl alcohol copolymer (EVOH), polyethylene, polypropylene, epoxy, or polystyrene. The liner 10 includes one cylindrical body portion 12 and two hemispherical dome portions 14 located at both ends of the body portion 12 along the central axis AX. Each dome portion 14 has an opening in its top. Boundaries BD shown in FIG. 1 are connections between the dome portions 14 and the body portion 12 of the liner 10, and are positions where the curvature of the outer shape of the liner 10 become zero. The liner 10 may be made of metal instead of resin. The shape of the body portion 12 is not limited to a cylinder, and may be any tubular shape with a polygonal cross section.

The bosses 16, 17 are mounted in the openings in the tops of the dome portions 14 of the liner 10. For example, the boss 16 is used to fill the gas tank 100 with gas or to discharge gas from the gas tank 100. The boss 17 is sealed and is used for centering etc. during manufacturing.

The fiber reinforced resin layer 20 is a reinforcing layer for reinforcing the liner 10. The fiber reinforced resin layer 20 is formed so as to cover the outer periphery of the liner 10 using fiber reinforced plastics (FRP). In the present embodiment, the fiber reinforced resin layer 20 is formed by a so-called resin transfer molding (RTM) method. Specifically, a base body (also called "fiber preform"), namely the liner 10 with a fiber layer formed on its outer periphery, is prepared and placed in a mold. The "fiber layer" means a layer formed by winding fiber materials. As will be described later, the fiber layer has a multi-layer structure in which two types of fiber layers, a first fiber layer L1 and a second fiber layer L2, are stacked in a predetermined order in the thickness direction. The fiber materials may be wound around the outer surfaces of the bosses 16, 17 in addition to the outer surface of the liner 10.

In the present embodiment, the fiber materials are carbon fiber. The fiber materials may be carbon fiber, glass fiber, aramid fiber, boron fiber, high-strength polyethylene fiber, etc., or may be a combination of two or more of these fibers. The number of fiber layers is, for example, about 10 to 20, and can be set as desired according to the size and shape of the gas tank 100. In the present embodiment, the number of fiber layers is 12.

The mold with the base body placed therein is closed, and the closed mold is pressure-filled with a resin material at high speed and high pressure to impregnate the fiber layers with the resin material. When impregnating the fiber layer with the resin material, the inside of the base body placed in the mold, that is, the inside of the liner 10, is filled with, for example, nitrogen gas in order to apply an internal pressure high enough to withstand an external pressure applied from the resin material during impregnation. The gas tank 100 is completed by curing the resin material infiltrating the fiber layers.

Figure 2:
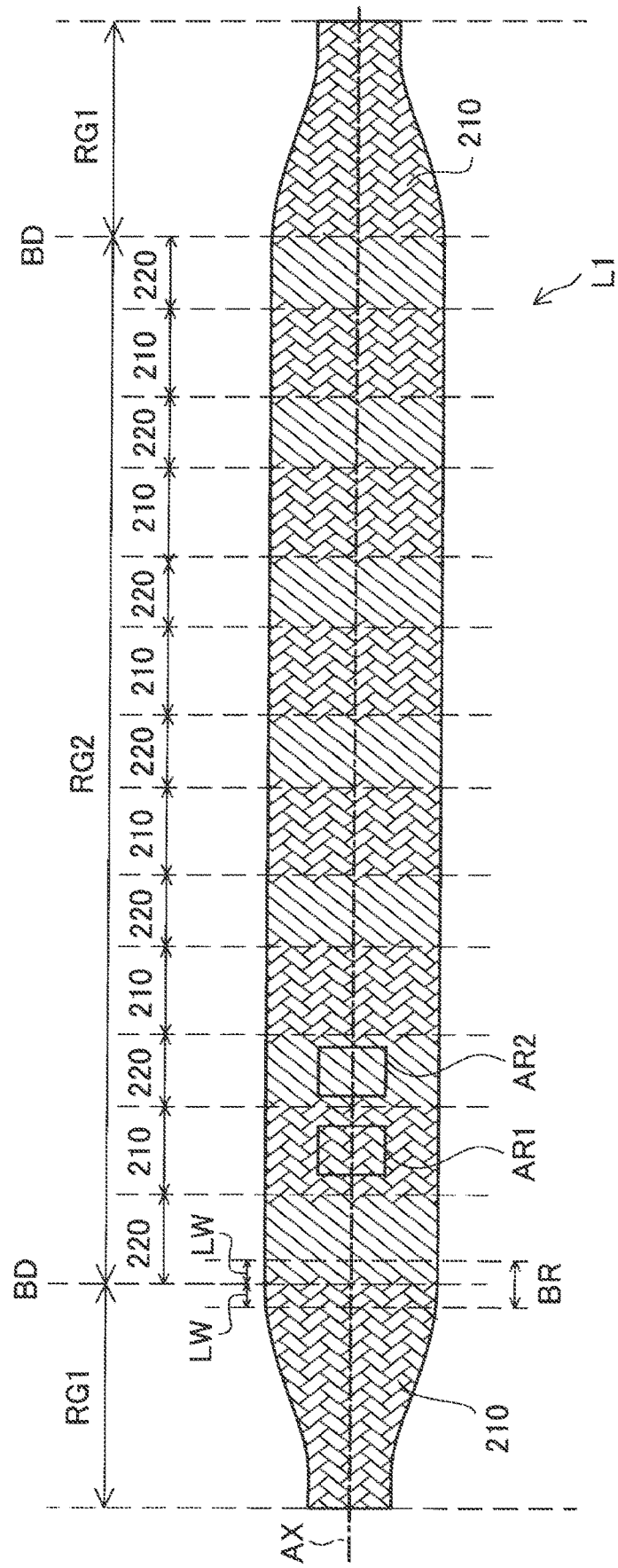
FIG. 2 illustrates the appearance of a base body having a first fiber layer on the outer periphery of a body portion.

FIG. 2 illustrates the appearance of the base body having the first fiber layer L1 on the outer periphery of the body portion 12. The "first fiber layer" refers to a fiber layer that includes both a first reinforcing portion 210 and a second reinforcing portion 220 in an area RG2 that is the outer periphery of the body portion 12. The "first reinforcing portion" is a part of the fiber layer that is formed by so-called braiding winding. The term "braiding winding" refers to a winding method in which the fiber materials are wound in a staggered weave pattern. The "second reinforcing portion" is a part of the fiber layer that is formed by so-called helical winding. The term "helical winding" refers to a winding method in which the fiber materials are wound around the body portion 12 at one predetermined angle with respect to the central axis AX of the liner 10 and then further wound around the body portion 12 at another predetermined angle with respect to the central axis AX.

In the present embodiment, the first fiber layer L1 includes a plurality of first reinforcing portions 210 and a plurality of second reinforcing portions 220, and has a so-called striped appearance. The positions, numbers, and widths of the first reinforcing portions 210 and the second reinforcing portions 220 in the area RG2 of the first fiber layer L1 vary depending on the number of layers stacked on the liner 10. In the example of FIG. 2, six first reinforcing portions 210 and seven second reinforcing portions 220 are formed alternately. Each of the first reinforcing portions 210 and the second reinforcing portions 220 has a predetermined width in the axial direction, and is wound around the body portion 12 in the circumferential direction. FIG. 2 schematically shows the first reinforcing portions 210 and the second reinforcing portions 220 in order to facilitate understanding of the technique, and does not accurately show the dimensions of each portion.

As shown in FIG. 2, in the present embodiment, the first fiber layer L1 includes a first reinforcing portion 210 in each of areas RG1 that are the outer peripheries of the dome portions 14. According to the gas tank 100 of the present embodiment, the first reinforcing portion 210 is formed on the outer periphery of each dome portion 14 having a curvature. This configuration can reduce slipping of the fiber materials as compared to helical winding. Regarding the first fiber layer L1, as long as the gas tank 100 with sufficient strength is obtained, a second reinforcing portion 220 may be formed in each area RG1, or the fiber layer in the areas RG1 may be omitted and the first reinforcing portion 210 may be formed only on the outer periphery of the body portion 12.

In the first fiber layer L1, the first reinforcing portions 210 in the areas RG1 and the first reinforcing portions 210 and the second reinforcing portions 220 in the area RG2 are formed continuously. Specifically, after forming the first reinforcing portion 210 in one of the areas RG1, the first reinforcing portions 210 and the second reinforcing portions 220 are continuously formed in the area RG2. The second reinforcing portions 220 and the first reinforcing portions 210 are alternately formed in the area RG2 while switching the winding method for the fiber materials. After forming the fiber layer in the area RG2, the first reinforcing portion 210 is formed in the other area RG1. The first fiber layer L1 is thus completed.

Figure 3:
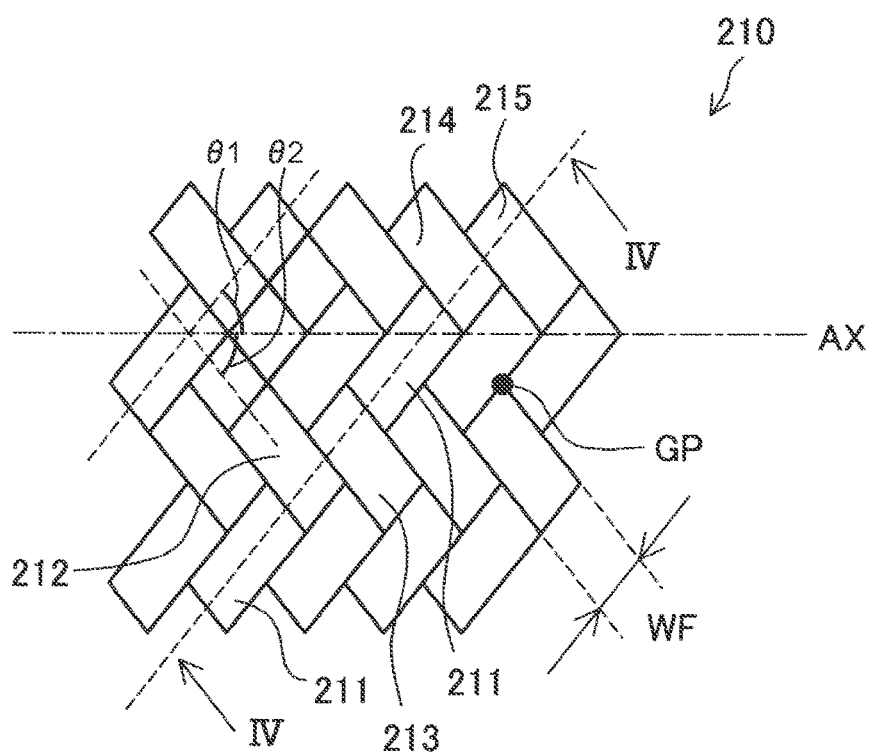
FIG. 3 illustrates in an enlarged view a part of a first reinforcing portion.
Figure 4:
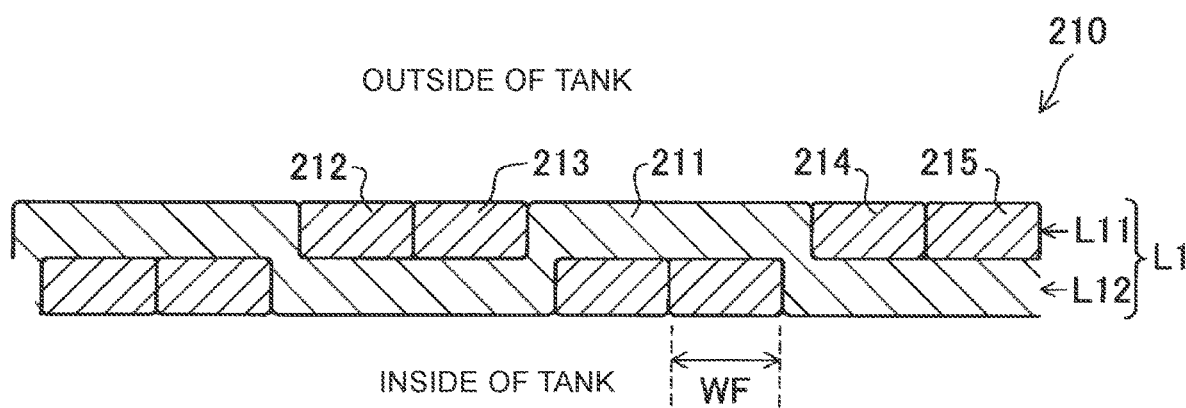
FIG. 4 is a sectional view taken along line IV-IV in FIG. 3.

FIG. 2 schematically shows a boundary portion BR in the first fiber layer L1. In the example of FIG. 2, the boundary portion BR is a position where the winding method is switched to form the second reinforcing portion 220 after forming the first reinforcing portion 210 in the one area RG1. The boundary portion BR includes the boundary BD between the dome portion 14 and the body portion 12 of the liner 10 and has a predetermined width. Specifically, the boundary portion BR is an area having the predetermined width equal to double a distance LW on both sides in the axial direction from the boundary BD. The boundary portion BR is a tolerance range. The distance LW corresponds to double a width WF of the fiber material, namely the total width of two fiber materials FIG. 3 illustrates in an enlarged view an area AR1 that is a part of the first reinforcing portion 210. FIG. 4 is a sectional view taken along line IV-IV in FIG. 3. As shown in FIGS. 3 and 4, the fiber material has an external shape in the form of a strip with the predetermined width WF. The predetermined width is, for example, several millimeters. However, the fiber material may be in any form such as a thread or a flat sheet. The thickness of one fiber material can be set to any thickness of, for example, 0.5 millimeters or less. In the present embodiment, the thickness of one fiber material is 0.3 millimeters.

As shown in FIG. 3, a fiber material 211 is wound at an elevation angle $\theta1$ with respect to the central axis AX of the liner 10. Fiber materials 212 to 215 are wound at a depression angle $\theta2$ with respect to the central axis AX of the liner 10. The angles $\theta1$, $\theta2$ can be set as desired. The angles $\theta1$, $\theta2$ are preferably set in consideration of, for example, the stress that acts on the body portion 12 of the liner 10. In the present embodiment, in order to obtain the gas tank 100 with sufficient strength, the angle $\theta1$ is set to, for example, around +54.7 degrees with respect to the central axis AX, and the angle $\theta2$ is set to, for example, −54.7 degrees with respect to the central axis AX.

As shown in FIG. 4, the first reinforcing portion 210 is formed by weaving the fiber material 211 and the fiber materials 212 to 215 in a staggered pattern such that the fiber material 211 and the fiber materials 212 to 215 are located alternately inside and outside in the stacking direction. In the present embodiment, the fiber material 211 is staggered every two fiber materials. The first reinforcing portion 210 includes: a layer L11 located on the outer side of the gas tank 100 and having a thickness corresponding to the thickness of one fiber material; and a layer L12 located on the inner side of the gas tank 100 and having a thickness corresponding to the thickness of one fiber material. The thickness of the first reinforcing portion 210 of each first fiber layer L1 is equal to the total thickness of two fiber materials.

As shown in FIG. 3, the first reinforcing portion 210 is formed by weaving a plurality of fiber materials in a staggered pattern. Therefore, the restraining force between the fiber materials is larger than in helical winding. Accordingly, for example, the pattern of the fiber materials in the first reinforcing portion 210 is less likely to be distorted, and the fiber materials in the first reinforcing portion 210 are less likely to slip and be displaced from their intended positions when being wound, as compared to the second reinforcing portion 220.

As shown in FIG. 3, in the first reinforcing portion 210, a plurality of fiber materials is woven in a staggered pattern, and therefore gaps GP may form between the woven fiber materials. Accordingly, the first reinforcing portion 210 can be more easily impregnated with the resin material, as compared to a fiber layer in which fiber materials are in close contact with each other like a fiber layer formed by helical winding.

Figure 5:
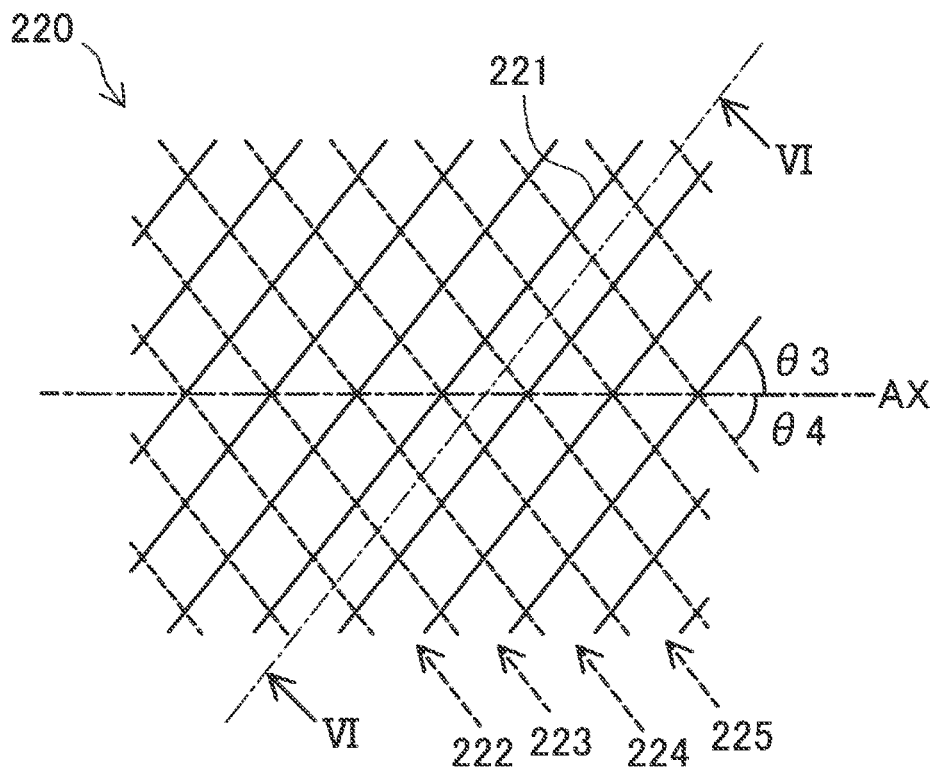
FIG. 5 illustrates in an enlarged view the appearance of a second reinforcing portion.

FIG. 5 illustrates in an enlarged view the appearance of the second reinforcing portion 220. In FIG. 5, an area AR2 that is a part of the second reinforcing portion 220 is shown in an enlarged view. As shown in FIG. 5, a fiber material 221 is wound at an elevation angle θ3 with respect to the central axis AX of the liner 10. Fiber materials 222 to 225 are wound at a depression angle θ4 with respect to the central axis AX. The angles θ3, θ4 can be set as desired in consideration of, for example, the stress that acts on the body portion 12 of the liner 10. In the present embodiment, the angles θ3, θ4 are set similarly to the angles θ1, θ2 described above.

Figure 6:
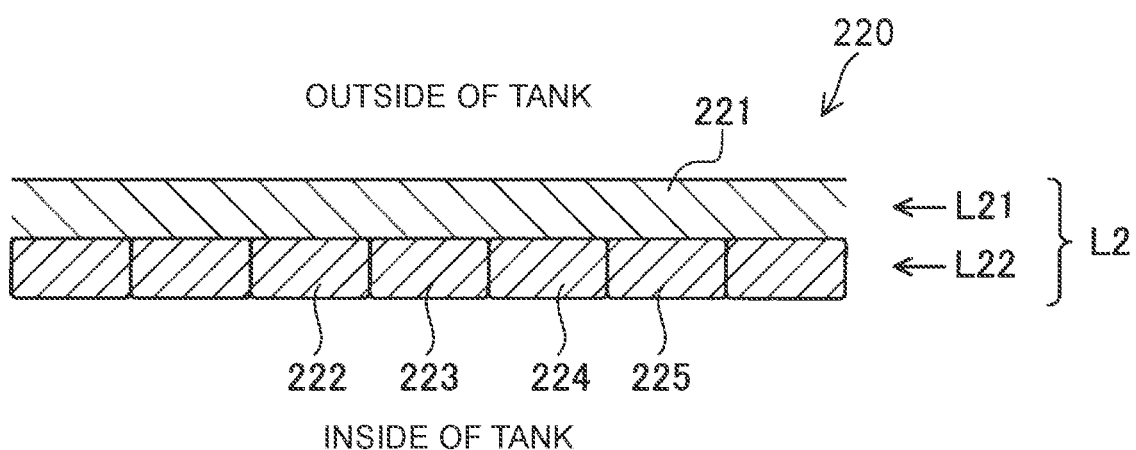
FIG. 6 is a sectional view taken along line VI-VI in FIG. 5.

FIG. 6 is a sectional view taken along line VI-VI in FIG. 5. As shown in FIG. 6, the second reinforcing portion 220 includes: a layer L21 located on the outer side of the gas tank 100 like the fiber material 221; and a layer L22 located on the inner side of the gas tank 100 like the fiber materials 222 to 225. The layers L21, L22 are continuous with the fiber materials forming the layers L11, L12 described above. In the following description, the combination of the two layers L11, L12 is counted as "one first fiber layer L1," and similarly, the combination of the two layers L21, L22 is counted as "one second fiber layer L2." In the present embodiment, the thickness of the second reinforcing portion 220 is 0.6 millimeters.

As shown in FIGS. 5 and 6, in the second reinforcing portion 220, a plurality of fiber materials is wound in parallel so as to be in close contact with each other by helical winding. Therefore, the density of the fiber materials is higher than that obtained by braiding winding. The strength of the gas tank 100 is thus increased. Since the fiber materials are in close contact with each other in the second reinforcing portion 220, it may be more difficult for the second reinforcing portion 220 to be impregnated with the resin material than the first reinforcing portion 210 when the mold is pressure-filled with the resin material by the RTM method.

Figure 7:
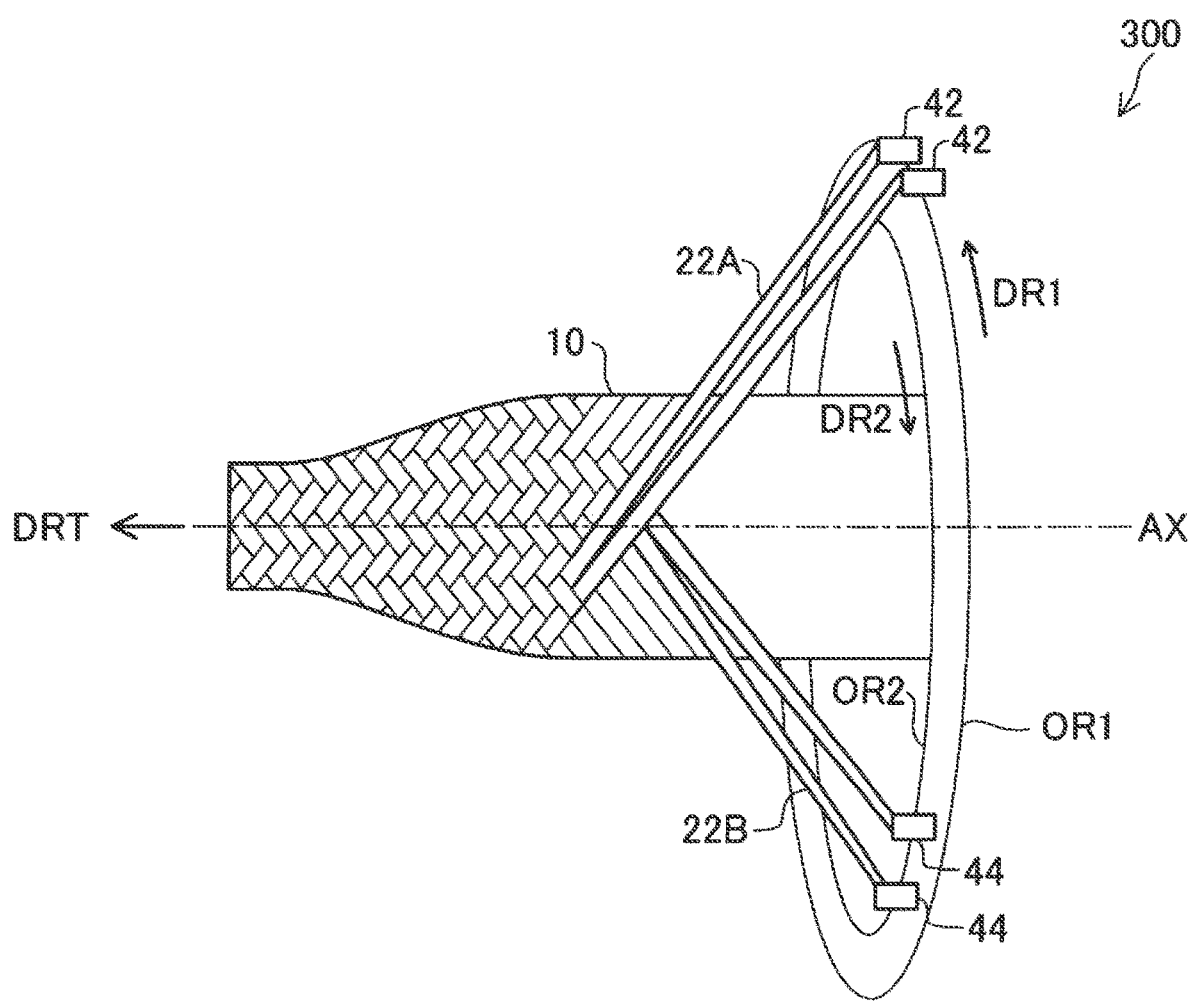
FIG. 7 illustrates a schematic configuration of a manufacturing device for the gas tank.

FIG. 7 illustrates a schematic configuration of a manufacturing device 300 for the gas tank 100. The manufacturing device 300 is a device for winding fiber materials around the liner 10. The manufacturing device 300 includes: first feed units 42 and second feed units 44 for feeding fiber materials; and a moving mechanism, not shown, for moving the liner 10 in a direction DRT. For convenience of illustration, two first feed units 42 and two second feed units 44 are shown in FIG. 7. However, the number of first feed units 42 and the number of second feed units 44 actually correspond to the number of fiber materials to be wounded.

The manufacturing device 300 rotates the first feed units 42 each feeding a fiber material 22A and the second feed units 44 each feeding a fiber material 22B along travel paths OR1, OR2 about the liner 10, respectively. The manufacturing device 300 winds the fiber materials 22A, 22B around one dome portion 14, the body portion 12, and the other dome portion 14 of the liner 10 in this order while moving the liner 10 in the direction DRT along the axial direction.

The manufacturing device 300 can switch the travel paths OR1, OR2 to different paths when switching the winding method from helical winding to braiding winding. The travel paths OR1, OR2 for helical winding are shown in the example of FIG. 7.

Figure 8:
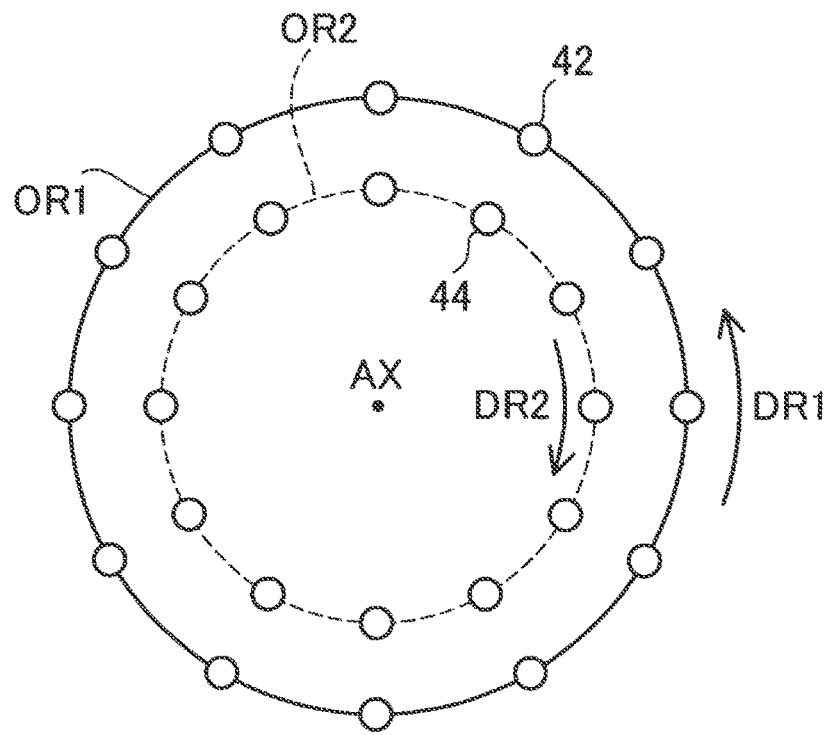
FIG. 8 illustrates travel paths of first feed units and second feed units for helical winding.

FIG. 8 illustrates the travel paths OR1, OR2 of the first feed units 42 and the second feed units 44 for helical winding. The travel path OR1 of the first feed units 42 is shown by a continuous line, and the travel path OR2 of the second feed units 44 is shown by a dashed line. The first feed units 42 and the second feed units 44 are arranged on, for example, two travel paths OR1, OR2 that are concentric circles about the central axis AX. The travel path OR1 is located at a position farther away from the central axis AX than the travel path OR2. That is, the travel path OR1 is a radially outer travel path. The travel paths OR1, OR2 are not limited to concentric circles, and may be paths in any shape along which the first feed units 42 and the second feed units 44 can rotate about the central axis AX.

As shown in FIG. 8, a direction DR1 in which the first feed units 42 move along the travel path OR1 and a direction DR2 in which the second feed units 44 move along the travel path OR2 are opposite to each other. As shown in FIG. 7, a plurality of fiber materials 22B is wound around the liner 10 at the depression angle θ4 with respect to the central axis AX by the second feed units 44 that rotate in the direction DR2. A plurality of fiber materials 22A is wound on the fiber materials 22B at the elevation angle θ3 with respect to the central axis AX by the first feed units 42 that rotate in the direction DR1. As a result, the second reinforcing portion 220 in which the layer L21 is located outside and the layer L22 is located inside is formed on the outer periphery of the body portion 12.

Figure 9:
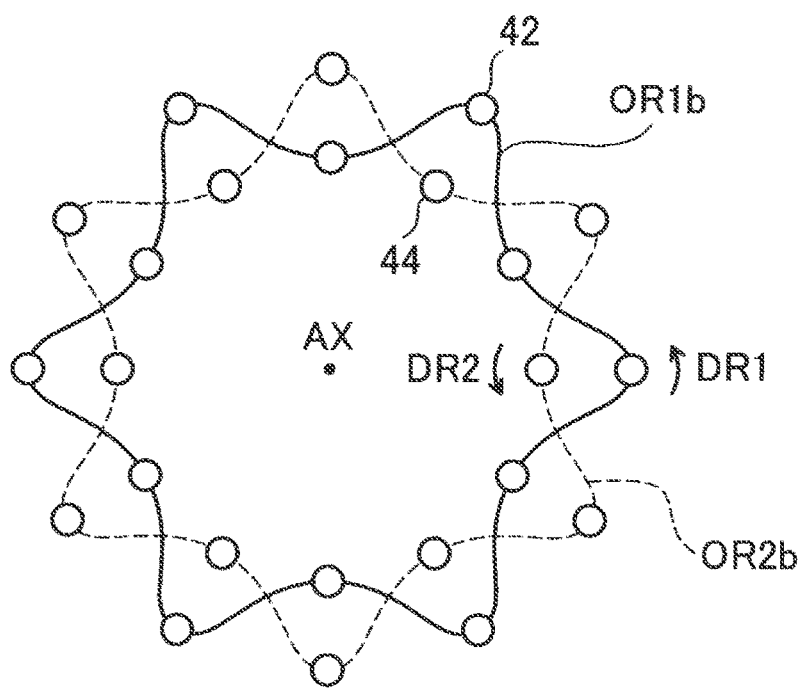
FIG. 9 illustrates travel paths of the first feed units and the second feed units for braiding winding.

FIG. 9 illustrates travel paths OR1b, OR2b of the first feed units 42 and the second feed units 44 for braiding winding. In order to facilitate understanding of the technique, the travel path OR1b of the first feed units 42 is shown by a continuous line, and the travel path OR2b of the second feed units 44 is shown by a dashed line in FIG. 9.

As shown in FIG. 9, the direction DR1 in which the first feed units 42 move along the travel path OR1b and the direction DR2 in which the second feed units 44 move along the travel path OR2b are opposite to each other. In the travel paths OR1b, OR2b, the state in which the first feed unit 42 is located inside in the radial direction and the second feed unit 44 is located outside in the radial direction and the state in which the second feed unit 44 is located inside in the radial direction and the first feed unit 42 is located outside in the radial direction are switched alternately. Accordingly, the fiber materials 22B that are fed at the depression angle θ2 with respect to the central axis AX and the fiber materials 22A that are fed at the elevation angle θ1 with respect to the central axis AX are wound around the liner 10 in a staggered weave pattern. As a result, the first reinforcing portion 210 in which the layer L11 is located outside and the layer L12 is located inside is formed on the outer periphery of the body portion 12.

The manufacturing device 300 can switch between the travel paths OR1, OR2 and the travel paths OR1b, OR2b at any time for the liner 10 moving in the direction DRT. For example, when forming the first fiber layer L1 shown in FIG. 2, the manufacturing device 300 performs braiding winding around one dome portion 14 using the travel paths OR1$b$, OR2$b$, and then switches the travel path OR1$b$, OR2$b$ to the travel paths OR1, OR2 in the boundary portion BR to perform helical winding around the body portion 12. The manufacturing device 300 forms a fiber layer in the area RG2, namely around the body portion 12, while switching between helical winding and braiding winding by switching the travel paths at each switching position between the first reinforcing portion 210 and the second reinforcing portion 220. After forming the fiber layer around the body portion 12, the manufacturing device 300 switches from the travel paths OR1, OR2 to the travel paths OR1$b$, OR2$b$ in the boundary portion BR between the body portion 12 and the other dome portion 14, and performs braiding winding around the other dome portion 14. When forming the second fiber layer L2, the manufacturing device 300 performs braiding winding around the entire liner 10 without switching the travel paths OR1, OR2.

Figure 10:
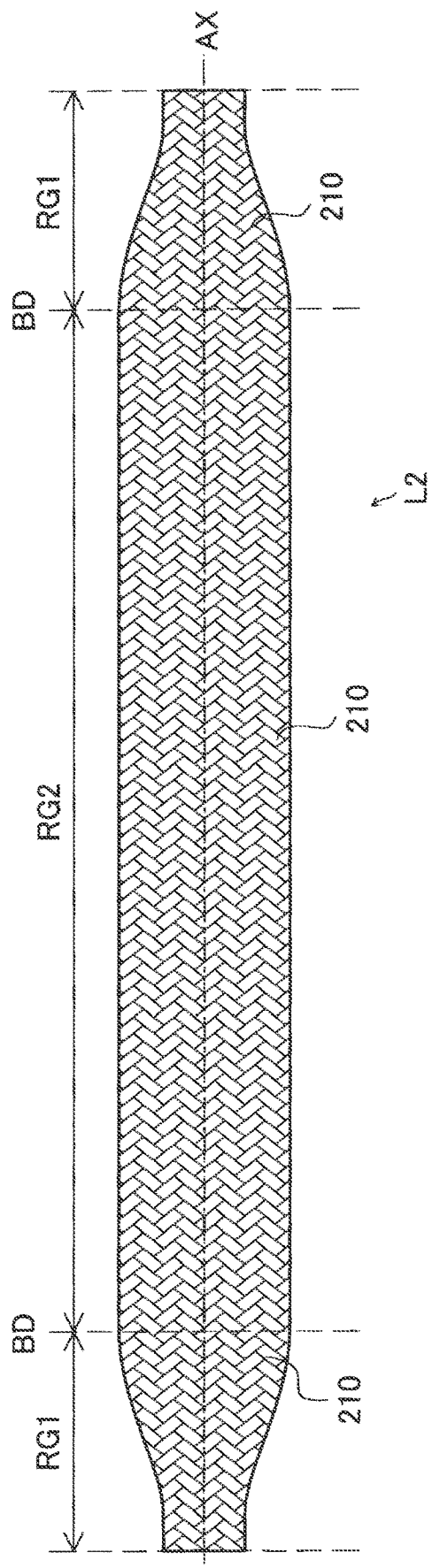
FIG. 10 illustrates the appearance of the base body having a second fiber layer on the outer periphery of the body portion.

FIG. 10 illustrates the appearance of the base body having the second fiber layer L2 on the outer periphery of the body portion 12. The "second fiber layer" means a fiber layer that includes the first reinforcing portion 210 in the area RG2 that is the outer periphery of the body portion 12 and does not include any second reinforcing portion 220 in the area RG2. The second fiber layer L2 differs from the first fiber layer L1 in that the second fiber layer L2 does not include any second reinforcing portion 220. In the present embodiment, the second fiber layer L2 includes the first reinforcing portion 210 not only in the area RG2 but also in the areas RG1 that are the outer peripheries of the dome portions 14 of the liner 10. That is, by forming only the first reinforcing portion 210 continuously in the areas RG1 and the area RG2, the first fiber layer L1 includes the first reinforcing portion 210 on the outer periphery of the entire liner 10. When forming the second fiber layer L2, the manufacturing device 300 performs braiding winding around the entire liner 10 without switching the travel paths OR1, OR2. The second fiber layer L2 is also called a "braiding winding layer" because it is formed on the outer periphery of the entire liner 10 by braiding winding. In the following description, as with the first fiber layer L1, the combination of the two layers L21, L22 is counted as "one second fiber layer L2." In the present embodiment, the thickness of the first reinforcing portion 210 is 0.6 millimeters. Regarding the second fiber layer L2, as long as the gas tank 100 with sufficient strength is obtained, a second reinforcing portion 220 may be formed in each area RG1, or the fiber layer in the areas RG1 may be omitted and the first reinforcing portion 210 may be formed only on the outer periphery of the body portion 12.

Figure 11:
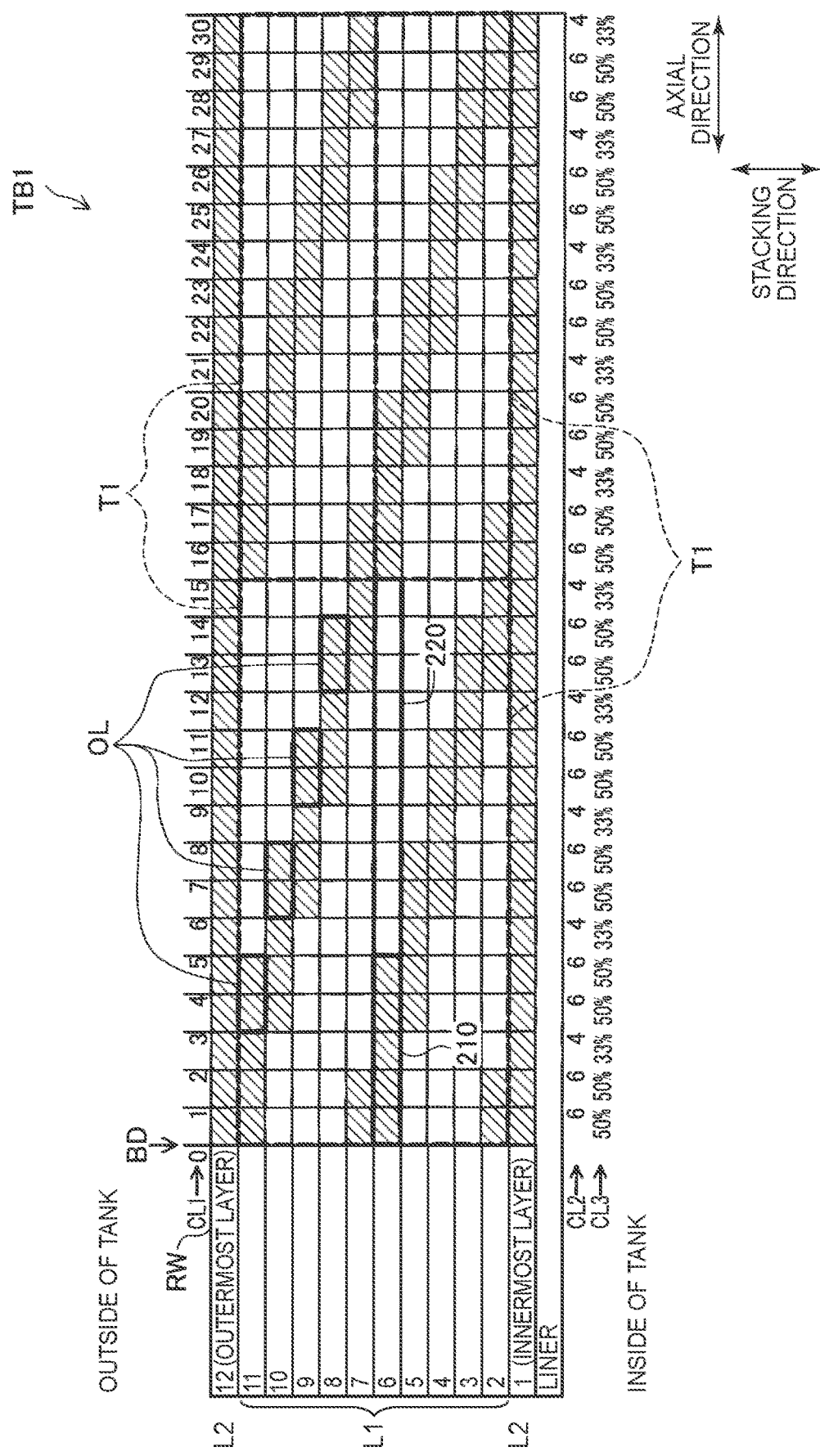
FIG. 11 schematically illustrates the configuration of a fiber reinforced resin layer of the gas tank according to the first embodiment of the present disclosure.

FIG. 11 schematically illustrates the configuration of the fiber reinforced resin layer 20 of the gas tank 100 according to the first embodiment of the present disclosure. Table TB1 shown in FIG. 11 corresponds to the fiber reinforced resin layer 20 in the area RG2 as viewed in section. Table TB1 schematically shows arrangement of the first fiber layers L1 and the second fiber layers L2 in the stacking direction and arrangement of the first reinforcing portions 210 and the second reinforcing portions 220 in the axial direction. For convenience of illustration, Table TB1 shows the fiber layers in a part of the area RG2. However, for example, fiber layers having the same configuration as that shown in Table TB1 are actually repeatedly formed to the right of the right end of Table TB1.

A horizontal axis CL1 in Table TB1 represents the distance in the axial direction from the left end, namely from the boundary BD, in centimeters. A column RW indicates the number of each fiber layer included in the fiber reinforced resin layer 20 on the liner 10. The bottom row of Table TB1 represents the liner 10, and the area below the bottom row of Table TB1 indicates the inside of the gas tank 100. The top row of Table TB1 indicates the twelfth fiber layer that is the outermost layer of the fiber reinforced resin layer 20. The first fiber layer formed on the outer surface of the liner 10 is also referred to as the "innermost layer," and the fiber layers between the innermost layer and the outermost layer (in the present embodiment, the second to eleventh fiber layers) are also referred to as the "inner layers." Regarding the first reinforcing portions 210 and the second reinforcing portions 220, one block in Table TB1 and the subsequent tables TB2 to TB5 represents a portion that is one centimeter wide and one fiber layer high for convenience of illustration. In order to facilitate understanding of the technique, the first reinforcing portions 210 are shown hatched in the tables.

As shown in FIG. 11, in the gas tank 100 of the present embodiment, the first fiber layers L1 each including both the first reinforcing portions 210 formed by braiding winding and the second reinforcing portions 220 formed by helical winding on the outer periphery of the body portion 12 are provided as the inner layers of the fiber reinforced resin layer 20. Since the first fiber layers L1 include the second reinforcing portions 220, the strength of the gas tank 100 can be increased. Moreover, since the first fiber layers L1 include the first reinforcing portions 210, the impregnation performance of the fiber layers with the resin material can be improved. Accordingly, the gas tank 100 with a good balance of reduction in insufficient impregnation with the resin material and improvement in strength can be obtained. Since both the first reinforcing portion 210 and the second reinforcing portion 220 are provided in one fiber layer, the gas tank 100 with a better balance of the shape, strength and impregnation performance in each fiber layer can be obtained as compared to the case where the first reinforcing portion 210 and the second reinforcing portion 220 are provided in different layers.

In the gas tank 100 of the present embodiment, the second fiber layer L2 is formed as the outermost layer of the fiber reinforced resin layer 20. When the mold is pressure-filled with the resin material by the RTM method, the resin material with high speed and high pressure collides with the fiber layer. This may cause distortion of the pattern of the fiber materials and separation and lifting of the fiber materials. Since the second fiber layer L2 including only the first reinforcing portion 210 having a large restraining force between the fiber materials is formed as the outermost layer, distortion of the pattern of the fiber materials and separation of the fiber materials on the outer surface of the fiber layer due to collision of the resin material with the fiber layer can be reduced or prevented.

In the gas tank 100 of the present embodiment, the second fiber layer L2 is formed as the innermost layer of the fiber reinforced resin layer 20. The innermost layer of the fiber reinforced resin layer 20 is susceptible to deformation of the liner 10, and tends to have a higher density of the fiber materials than the inner layers of the fiber reinforced resin layer 20. Therefore, it may be more difficult for the innermost layer of the fiber reinforced resin layer 20 to be impregnated with the resin material than the other layers. This characteristic is particularly remarkable when the liner 10 is made of resin that is easily deformed. In the present embodiment, the second fiber layer L2 including only the first reinforcing portion 210 that is easily impregnated with the resin material is formed as the innermost layer of the fiber reinforced resin layer 20. Therefore, insufficient impregnation of the innermost layer with the resin material can be reduced or prevented.

In the gas tank 100 of the present embodiment, all the inner layers of the fiber reinforced resin layer 20 are the first fiber layers L1, and therefore each inner layer includes both the first reinforcing portions 210 and the second reinforcing portions 220. According to the gas tank 100 with this configuration, the gas tank 100 with a good balance of the shape, strength, and impregnation performance in all the fiber layers can be obtained.

In the present embodiment, the first reinforcing portions 210 and the second reinforcing portions 220 are arranged according to a predetermined rule, and are arranged at different positions in each of the first fiber layers L1. Regions T1 each surrounded by a dashed line are shown in FIG. 11. Each region T1 is a region that is five fiber layers high and centimeters wide. In the example of FIG. 11, the inner layers are divided into four regions T1. In the lower left region T1 in FIG. 11, a first reinforcing portion 210 with a width of five centimeters in the axial direction is located at the left end of the sixth layer, and a second reinforcing portion 220 with a width of 10 centimeters is located next to this first reinforcing portion 210. In the fifth layer, a first reinforcing portion 210 is located at a position shifted by three centimeters in the axial direction from the position of the first reinforcing portion 210 in the sixth layer. Similarly, in the fourth, third, and second layers, a first reinforcing portion 210 is located at a position shifted by three centimeters in the axial direction from the position of the first reinforcing portion 210 in the layer above. In the regions T1, the first reinforcing portion 210 and the second reinforcing portion 220 may be repeatedly arranged again from the left end when the above repeated pattern of the first and second reinforcing portions 210, 220 reaches the right end of the region T1. Moreover, the regions T1 of the inner layers of the fiber reinforced resin layer 20 are repeatedly arranged in the axial direction and the stacking direction. The first reinforcing portions 210 and the second reinforcing portions 220 are thus arranged regularly. FIG. 2 shows an example of the appearance of the base body with the fourth first fiber layer L1.

As shown in FIG. 11, the first reinforcing portion 210 includes an overlapping portion OL. The overlapping portion OL is a part of the first reinforcing portion 210 in the upper first fiber layer L1 that is stacked on top of at least a part of the first reinforcing portion 210 in the lower first fiber layer L1. The "upper first fiber layer L1" means a single fiber layer stacked on top of a subject fiber layer. Similarly, the "lower first fiber layer L1" means a single fiber layer located under a subject fiber layer. In the example of FIG. 11, the overlapping portion OL is a part of the first reinforcing portion 210 in the upper first fiber layer L1 that is two centimeters wide from the right edge of this first reinforcing portion 210, and is a part stacked on top of a part of the first reinforcing portion 210 in the lower first fiber layer L1 that is two centimeters wide from the left edge of this first reinforcing portion 210. According to the gas tank 100 of the present embodiment, the first reinforcing portion 210 in the upper first fiber layer L1 is stacked on the first reinforcing portion 210 in the lower first fiber layer L1 in an overlapping manner. Therefore, a flow path that allows the resin material to flow smoothly can be formed between the fiber layers, and the impregnation performance of the fiber layers with the resin material can be improved. The width of the overlapping portion OL is preferably 0.1 centimeters or more so that the resin material can smoothly flow between the layers of the first reinforcing portions 210. In the present embodiment, the width of the overlapping portion OL is set to two centimeters in consideration of improvement in impregnation performance with the resin material and mechanical variation in position where the winding method of the fiber materials is switched by the manufacturing device 300.

Figure 12:
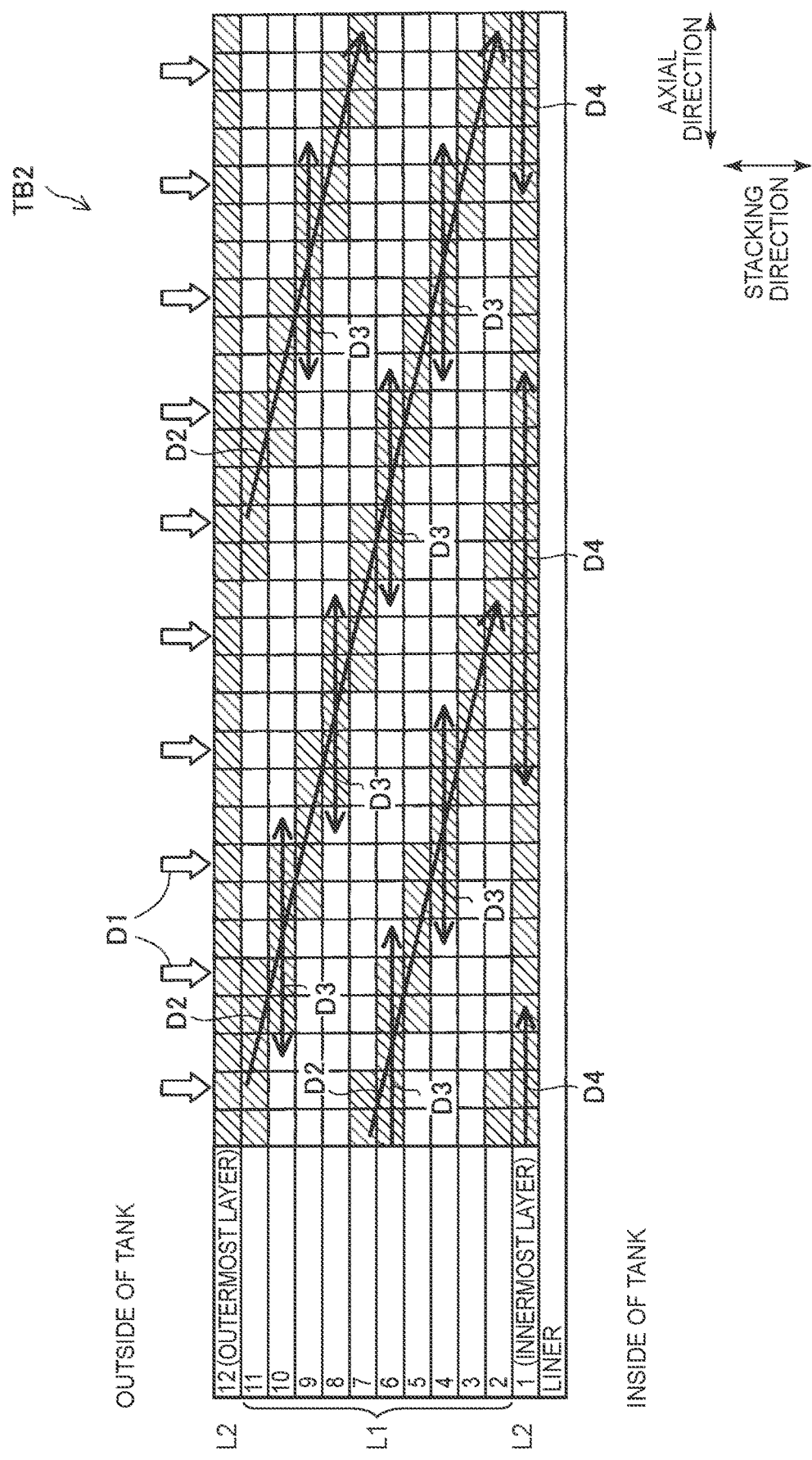
FIG. 12 schematically illustrates a flow path of a resin material when impregnating fiber layers with the resin material.

FIG. 12 schematically illustrates a flow path of the resin material when impregnating the fiber layers of the gas tank 100 of the present embodiment with the resin material. In Table TB2 shown in FIG. 12, arrows D1 to D4 each indicating the flow direction of the resin material are added to Table TB1 shown in FIG. 11. In the RTM method, the mold closed with the base body placed therein is filled with the resin material at high speed and high pressure. As shown by arrows D1, the resin material with high speed and high pressure collides with the outermost fiber layer in the mold and infiltrates the fiber layers.

In the gas tank 100 of the present embodiment, the first reinforcing portion 210 is provided in every fiber layer in the fiber reinforced resin layer 20, and the overlapping portion OL is provided in every first fiber layer L1 in the fiber reinforced resin layer 20. By providing the overlapping portion OL in each layer between the outermost and innermost layers of the fiber reinforced resin layer 20, the flow path that allows the resin material to smoothly flow between the fiber layers can be formed in all the layers between the outermost and innermost layers of the fiber reinforced resin layer 20 as shown by arrows D2. As a result, the impregnation performance of the fiber layers with the resin material can be improved. As shown by arrows D3, the resin material is supplied from the first reinforcing portions 210 and the second reinforcing portions 220 in the upper and lower first fiber layers L1 to the second reinforcing portions 220 in each fiber layer, and a larger amount of resin material than that of resin material thus supplied to the second reinforcing portions 220 in each layer infiltrates in the axial direction from the first reinforcing portions 210 in each layer. The resin material having reached the innermost layer infiltrates the entire second fiber layer L2 along the outer surface of the liner 10 as shown by arrows D4.

In the gas tank 100 of the present embodiment, each first fiber layer L1 includes a plurality of first reinforcing portions 210 and a plurality of second reinforcing portions 220. Since each first fiber layer L1 includes a plurality of first reinforcing portions 210, a plurality of flow paths of the resin material through the first reinforcing portions 210 can be formed. The impregnation performance of the fiber layers with the resin material can further be improved. Since the first reinforcing portions 210 are located in a dispersed manner at a plurality of positions in the axial direction, the gas tank 100 with a good balance of the strength of the fiber layers in the axial direction and reduction in insufficient impregnation with the resin material can be obtained.

As shown in FIG. 11, in the gas tank 100 of the present embodiment, the first reinforcing portions 210 in the upper first fiber layer L1 are located at positions shifted by three centimeters in the axial direction from the positions of the first reinforcing portions 210 in the lower first fiber layer L1. Since the first reinforcing portions 210 are thus located at positions shifted from each other in the axial direction, stress concentration in the fiber reinforced resin layer 20 can be reduced as compared to the case where the first reinforcing portions 210 are stacked linearly on top of each other in the stacking direction.

In the gas tank 100 of the present embodiment, the first reinforcing portion 210 in the upper first fiber layer L1 is stacked on a part of the first reinforcing portion 210 in the lower first fiber layer L1 other than the overlapping portion OL. That is, the first reinforcing portion 210 in the upper first fiber layer L1 is stacked so as not to be located on the overlapping portion OL in the lower first fiber layer L1, so that the overlapping portion OL is not formed on the overlapping portion OL. Since the first reinforcing portions 210 in three or more first fiber layers L1 are stacked so that the overlapping portions OL in these first fiber layers L1 do not overlap each other, stress concentration in the fiber reinforced resin layer 20 can be reduced.

As shown in FIG. 11, a horizontal axis CL2 of Table TB1 represents the total number of first reinforcing portions 210 in the stacking direction at a specific position, and this total number is shown for each distance from the boundary BD. A horizontal axis CL3 represents the occupancy (%) of the first reinforcing portions 210 in the fiber layers for each distance from the boundary BD. For example, at a distance of one centimeter to two centimeters from the boundary BD in the area RG2, the first reinforcing portion 210 is present in the innermost layer, the first layer, the sixth and seventh layers, the eleventh layer, and the outermost layer. Therefore, the total number of first reinforcing portions 210 is six. In the present embodiment, the number of layers of the fiber reinforced resin layer 20 is 12, and the occupancy of the first reinforcing portions 210 at this position is therefore 50%.

From the viewpoint of improving the impregnation performance with the resin material, the occupancy of the first reinforcing portions 210 in the stacking direction is preferably 30% or more. From the viewpoint of improving the strength of the fiber reinforced resin layer 20, the occupancy of the second reinforcing portions 220 is preferably 30% or more, and the occupancy of the first reinforcing portions 210 is preferably less than 70%. The occupancy of the first reinforcing portions 210 in the stacking direction is from 33% to 50%. The balance between improvement in strength of the gas tank 100 and impregnation performance with the resin material can therefore be improved.

In the gas tank 100 of the present embodiment, the total number of first reinforcing portions 210 in the stacking direction is four to six, as shown by the values on the horizontal axis CL2. That is, the difference between the maximum and minimum values of the total number of first reinforcing portions 210 in the stacking direction in the fiber reinforced resin layer 20 is three. The gas tank 100 with a good balance between strength of the fiber layers and reduction in insufficient impregnation with the resin material can be obtained by thus making the number of first reinforcing portions 210 in the stacking direction in the fiber reinforced resin layer 20 substantially uniform in the axial direction. The difference between the maximum and minimum values of the total number of first reinforcing portions 210 in the stacking direction is preferably three or less, and may be, for example, zero, one, or two.

B. Second Embodiment

Figure 13:
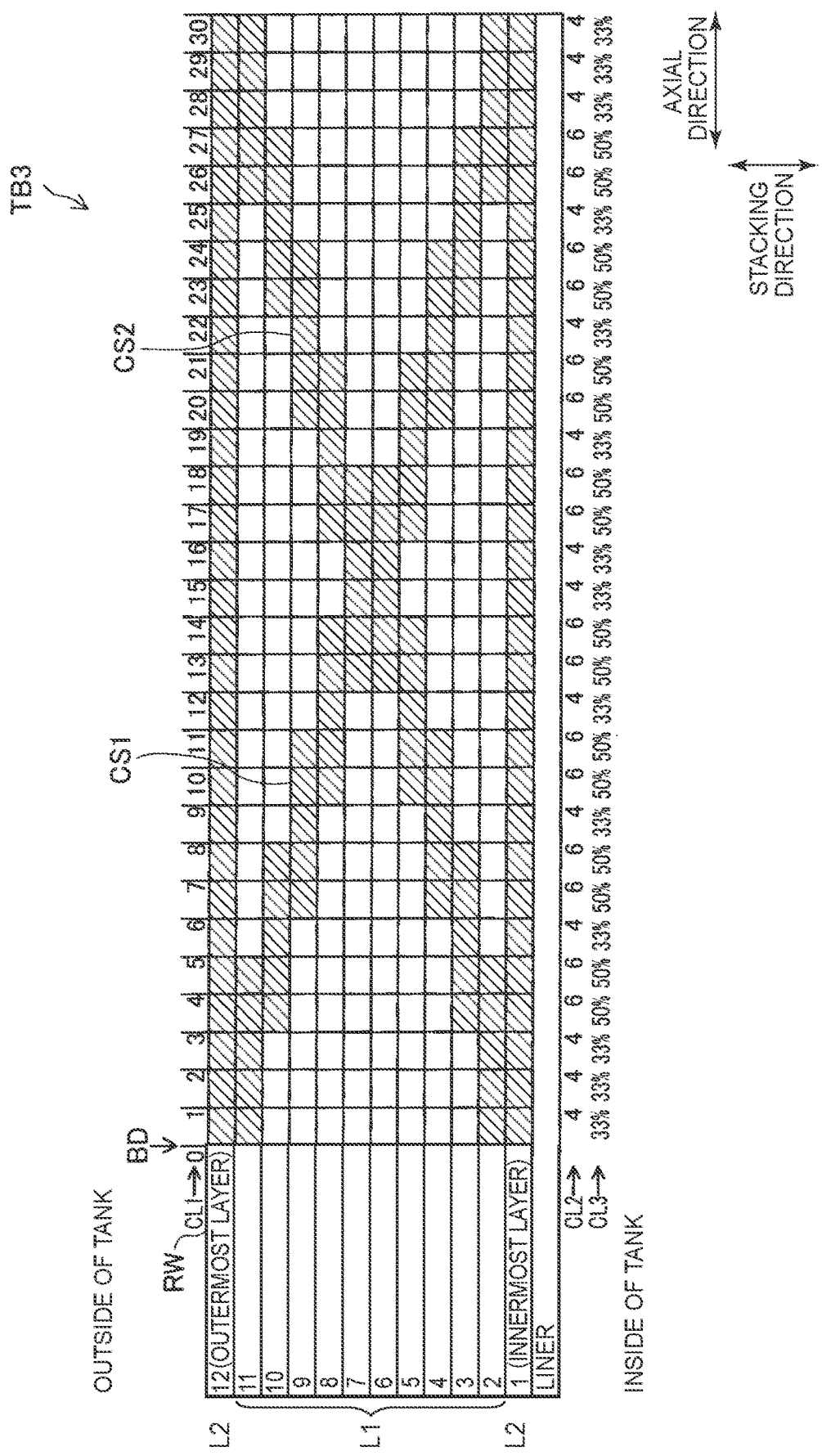
FIG. 13 schematically illustrates the configuration of a fiber reinforced resin layer of a gas tank according to a second embodiment of the present disclosure.

FIG. 13 schematically illustrates the configuration of the fiber reinforced resin layer 20 of the gas tank 100 according to a second embodiment of the present disclosure. Table TB3 shown in FIG. 13 corresponds to the fiber reinforced resin layer 20 in the area RG2 as viewed in section. The gas tank 100 of the second embodiment is different from the gas tank 100 of the first embodiment in the arrangement of the first reinforcing portions 210 and the second reinforcing portions 220 in the fiber reinforced resin layer 20. The configuration of the gas tank 100 of the second embodiment is otherwise similar to that of the gas tank 100 of the first embodiment.

As shown in Table TB3, in the fiber reinforced resin layer 20, the first reinforcing portions 210 are arranged in a first pattern CS1 and a second pattern CS2. The first pattern CS1 is a pattern in which the first reinforcing portions 210 are arranged so as to be shifted away from the boundary BD stepwise as it gets closer to the bottom layer, in order from the first reinforcing portion 210 located at the end on the boundary BD side of the eleventh layer. The second pattern CS2 is a pattern in which the first reinforcing portions 210 are arranged so as to be shifted toward the boundary BD stepwise as it gets closer to the bottom layer, in order from the first reinforcing portion 210 located at 30 centimeters from the boundary BD in the eleventh layer. The first reinforcing portions 210 are also arranged such that the first pattern CS1 and the second pattern CS2 cross each other. The first reinforcing portions 210 are thus arranged in a so-called cross shape symmetrically with respect to the stacking direction at a position that is 15 centimeters away from the boundary BD. According to the gas tank 100 of the present embodiment, the strength of the fiber reinforced resin layer 20 can be improved by using a truss structure in which the first reinforcing portions 210 are arranged line-symmetrically and are arranged in a plurality of substantially triangular shapes as viewed in section.

C. Third Embodiment

Figure 14:
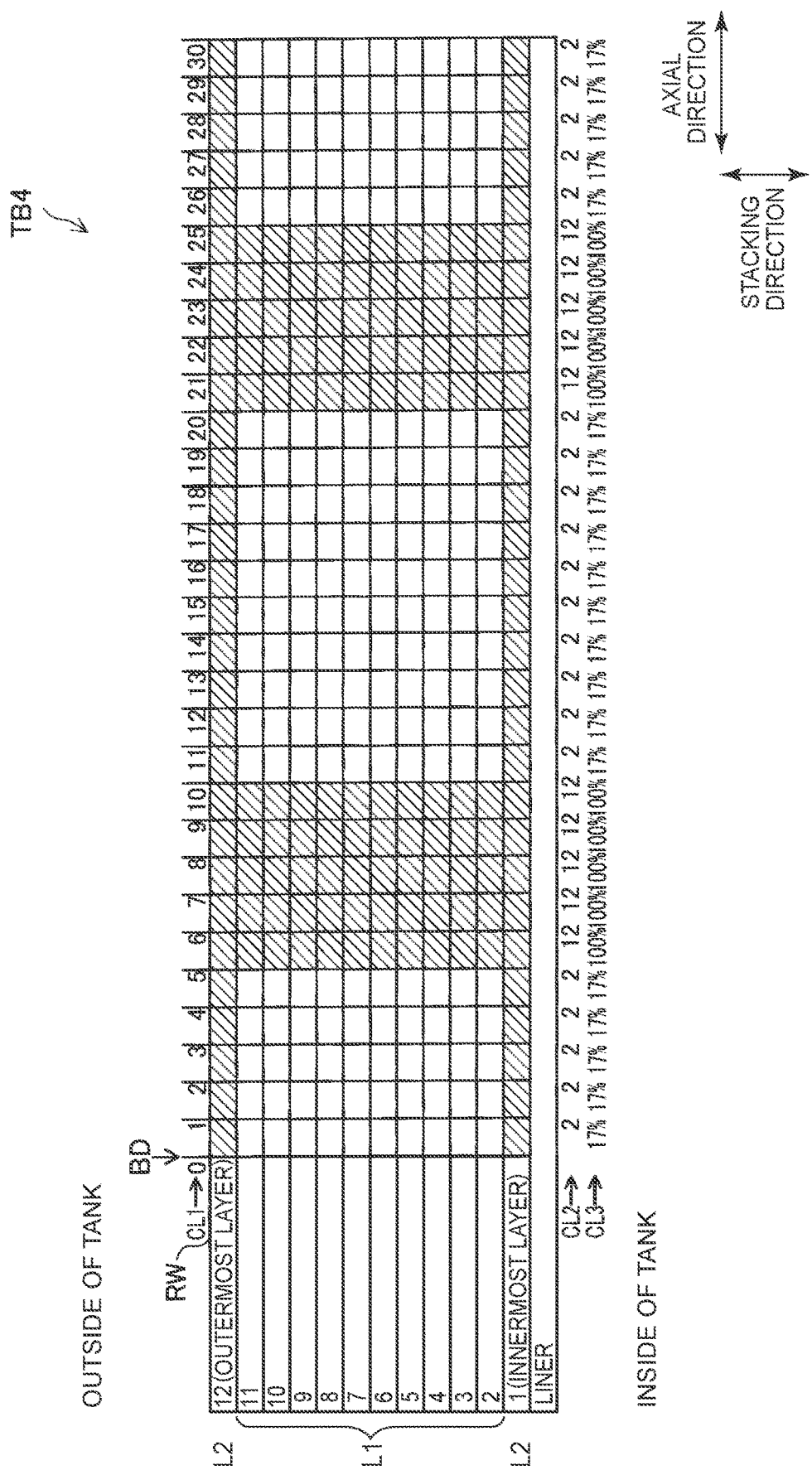
FIG. 14 schematically illustrates the configuration of a fiber reinforced resin layer of a gas tank according to a third embodiment of the present disclosure.

FIG. 14 schematically illustrates the configuration of the fiber reinforced resin layer 20 of the gas tank 100 according to a third embodiment of the present disclosure. Table TB4 shown in FIG. 14 corresponds to the fiber reinforced resin layer 20 in the area RG2 as viewed in section. The gas tank 100 of the third embodiment is different from the gas tank 100 of the first embodiment in the arrangement of the first reinforcing portions 210 and the second reinforcing portions 220 in the fiber reinforced resin layer 20. The configuration of the gas tank 100 of the third embodiment is otherwise similar to that of the gas tank 100 of the first embodiment.

As shown in FIG. 14, in the gas tank 100 of the present embodiment, the first reinforcing portions 210 are arranged in a stack with the first reinforcing portion 210 in the upper first fiber layer L1 being placed on top of the first reinforcing portion 210 in the lower first fiber layer L1. Since the first reinforcing portions 210 are arranged in a linear pattern in the stacking direction, the resin material can more easily infiltrate down to the innermost layer of the fiber reinforced resin layer 20. Therefore, insufficient impregnation of the innermost layer with the resin material can be reduced or prevented.

D. Fourth Embodiment

Figure 15:
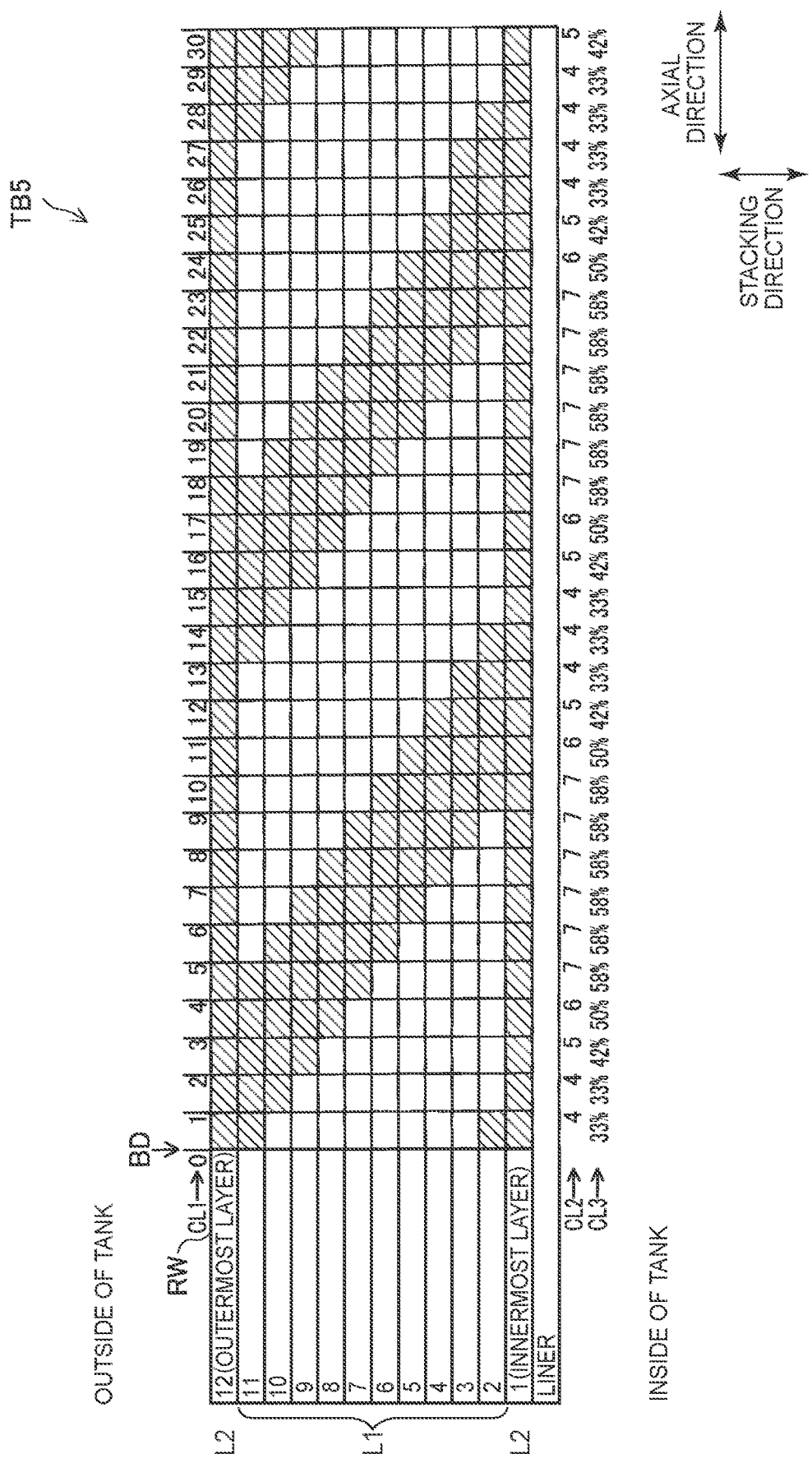
FIG. 15 schematically illustrates the configuration of a fiber reinforced resin layer of a gas tank according to a fourth embodiment of the present disclosure.

FIG. 15 schematically illustrates the configuration of the fiber reinforced resin layer 20 of the gas tank 100 according to a fourth embodiment of the present disclosure. Table TB5 shown in FIG. 15 corresponds to the fiber reinforced resin layer 20 in the area RG2 as viewed in section. The gas tank 100 of the fourth embodiment is different from the gas tank 100 of the first embodiment in the arrangement of the first reinforcing portions 210 and the second reinforcing portions 220 in the fiber reinforced resin layer 20. The configuration of the gas tank 100 of the fourth embodiment is otherwise similar to that of the gas tank 100 of the first embodiment.

The gas tank 100 of the first embodiment illustrates an example in which the first reinforcing portions 210 are arranged so as to be shifted away from the boundary BD stepwise by three centimeters in each layer as it gets closer to the bottom layer. On the other hand, in the gas tank 100 of the fourth embodiment, the first reinforcing portions 210 are arranged so as to be shifted away from the boundary BD stepwise by one centimeter in each layer as it gets closer to the bottom layer. As described above, the amount of offset between the first reinforcing portion 210 in the upper first fiber layer L1 and the first reinforcing portion 210 in the lower first fiber layer L1 is not limited to three centimeters, and may be set to any distance. The amount of offset is not limited to the distance, and may be set by the number of fiber materials etc.

The gas tank 100 of the first embodiment illustrates an example in which the first reinforcing portion 210 in the upper first fiber layer L1 is stacked on a part of the first reinforcing portion 210 in the lower first fiber layer L1 other than the overlapping portion OL. However, as shown in FIG. 15, the overlapping portions OL in three or more first fiber layers L1 may overlap each other.

E. Other Embodiments

E1

The first embodiment illustrates an example in which 10 first fiber layers L1 are provided as inner layers. However, the number of first fiber layers L1 that are provided as inner layers is not limited to 10, and may be one or any value equal to or larger than two.

E2

The first embodiment illustrates an example in which the outermost layer and the innermost layer are the second fiber layers L2. However, the outermost layer may be the first fiber layer L1, the innermost layer may be the first fiber layer L1, or both the outermost layer and the innermost layer may be the first fiber layers L1.

E3

The first embodiment illustrates an example in which the overlapping portion OL is a part of the first reinforcing portion 210 in the upper first fiber layer L1 that is two centimeters wide from the right edge of this first reinforcing portion 210, and the overlapping portion OL is stacked on top of a part of the first reinforcing portion 210 in the lower first fiber layer L1 that is two centimeters wide from the left edge of this first reinforcing portion 210. However, the size of the overlapping portion OL, namely the size of the part of the first reinforcing portion 210 in the upper first fiber layer L1 that is stacked on top of the first reinforcing portion 210 in the lower first fiber layer L1, may be set as desired. For example, the first reinforcing portion 210 in the upper first fiber layer L1 may be stacked on top of the entire first reinforcing portion 210 in the lower first fiber layer L1. Alternatively, the first reinforcing portion 210 in the upper first fiber layer L1 may be stacked on top of the first reinforcing portion 210 in the lower first fiber layer L1 such that the entire first reinforcing portion 210 in the upper first fiber layer L1 is located within the width of the first reinforcing portion 210 in the lower first fiber layer L1. When the impregnation performance of the fiber layers with the resin material is high enough, the first reinforcing portion 210 in the upper first fiber layer L1 and the first reinforcing portion 210 in the lower first fiber layer L1 may not overlap each other. That is, the overlapping portion OL may be omitted. Not all of the fiber layers in the fiber reinforced resin layer 20 need to have the overlapping portion OL. Only a part of the fiber layers in the fiber reinforced resin layer 20 may have the overlapping portion OL.

The present disclosure is not limited to the above embodiments, and can be implemented with various configurations without departing from the spirit and scope of the present disclosure. For example, the technical features of the embodiments corresponding to the technical features in each aspect described in the section "SUMMARY" may be replaced or combined as appropriate. When the technical features are not described as essential in this specification, such technical features can be omitted as appropriate.

What is claimed is:

1. A gas tank comprising:
   a liner including a tubular body portion having a central axis and a dome portion, the dome portion being located at two ends of the body portion in an axis direction parallel to the central axis; and
   a reinforcing layer configured to cover an outer periphery of the liner,
   wherein the reinforcing layer includes a first fiber layer provided on an outer periphery of the body portion, the first fiber layer including a first reinforcing portion and a second reinforcing portion, the first reinforcing portion being a portion in which fibers are wound in a staggered weave pattern, and the second reinforcing portion being a portion in which the fibers are wound at a predetermined angle with respect to the central axis,
   the first fiber layer includes a plurality of the first reinforcing portions and a plurality of the second reinforcing portions,
   a composition of an outermost layer of the reinforcing layer is a second fiber layer that includes the first reinforcing portion and that does not include the second reinforcing portion,
   a composition of an innermost layer of the reinforcing layer is the second fiber layer, the innermost layer contacting the outer periphery of the liner, and
   the first fiber layer is located between the outermost layer and the innermost layer in a stacking direction vertical to the central axis.

2. The gas tank according to claim 1, wherein:
   the reinforcing layer includes an upper first fiber layer and a lower first fiber layer stacking in the stacking direction; and
   the first reinforcing portion in the upper first fiber layer includes an overlapping portion stacked on at least a part of the first reinforcing portion in the lower first fiber layer.

3. The gas tank according to claim 2, wherein:
   the first reinforcing portion is included in all of the fiber layers included in the reinforcing layer; and
   the overlapping portion is included in all of the first fiber layers included in the reinforcing layer.

4. The gas tank according to claim 3, wherein the first reinforcing portion in the upper first fiber layer is located at a position shifted in an axial direction of the liner from the first reinforcing portion in the lower first fiber layer.

5. The gas tank according to claim 4, wherein the first reinforcing portion in the upper first fiber layer is stacked on a part of the first reinforcing portion other than the overlapping portion in the lower first fiber layer.

6. The gas tank according to claim 1, wherein the first fiber layer includes the first reinforcing portion on an outer periphery of the dome portion.

7. The gas tank according to claim 1, wherein:
the reinforcing layer includes a plurality of the first fiber layers stacking in the stacking direction; and
the first fiber layers are located between the outermost layer and the innermost layer in the stacking direction.

8. A method for manufacturing a gas tank, the method comprising
preparing a liner including a tubular body portion having a central axis and a dome portion, the dome portion being located at two ends of the body portion in an axis direction parallel to the central axis; and
forming a base body being the liner with a fiber layer provided on an outer periphery of the liner, by forming a first fiber layer provided on an outer periphery of the body portion, the first fiber layer including a first reinforcing portion and a second reinforcing portion, wherein
the first reinforcing portion is a portion in which fibers are wound in a staggered weave pattern,
the second reinforcing portion is a portion in which the fibers are wound at a predetermined angle with respect to the central axis,
the first fiber layer includes a plurality of the first reinforcing portions and a plurality of the second reinforcing portions,
a composition of an outermost layer of the reinforcing layer is a second fiber layer that includes the first reinforcing portion and that does not include the second reinforcing portion,
a composition of an innermost layer of the reinforcing layer is the second fiber layer, the innermost layer contacting the periphery of the liner, and
the first fiber layer is located between the outermost layer and the innermost layer in a stacking direction vertical to the central axis.

9. The method according to claim 8, the method further comprising:
placing the base body in a mold and closing the mold; and
filling the closed mold with a resin material to impregnate the fiber layer of the base body with the resin material.

* * * * *